United States Patent [19]
DeWesse

[11] 3,992,255
[45] Nov. 16, 1976

[54] CONTROL ROD DRIVE MECHANISM FOR A NUCLEAR REACTOR

[75] Inventor: John L. DeWesse, Monroeville, Pa.

[73] Assignee: Westinghouse Electric Corporation, Pittsburgh, Pa.

[22] Filed: Jan. 18, 1974

[21] Appl. No.: 434,722

[52] U.S. Cl. .............................. 176/36 C; 310/14; 226/150; 74/527
[51] Int. Cl.² ......................................... G21C 7/08
[58] Field of Search ........... 176/36; 310/14; 226/59, 226/150; 74/527

[56] References Cited
UNITED STATES PATENTS

| | | | |
|---|---|---|---|
| 3,572,161 | 3/1971 | Lichtenberger et al. | 176/36 R |
| 3,765,585 | 10/1973 | Ruoss | 310/14 |

*Primary Examiner*—Samuel Feinberg
*Attorney, Agent, or Firm*—Z. L. Dermer

[57] ABSTRACT

A drive mechanism for a control rod of a nuclear reactor adapted for rapid refueling is disclosed which electromechanically grips and moves a control rod in a step-by-step manner. Locking apparatus is included with the drive mechanism which locks the control rod in position when it is fully withdrawn from the core. The locking apparatus prevents the drive mechanism from inadvertently dropping the control rod. Therefore, during rapid refueling of a core, when the control rods are withdrawn and stored within an upper core supporting structure, there is no possibility of a control rod being accidentally dropped so as to interface with the rapid refueling operations.

8 Claims, 4 Drawing Figures

CONTROL ROD DRIVE MECHANISM FOR A NUCLEAR REACTOR

BACKGROUND OF THE INVENTION

1. Field of the Invention

This invention pertains to control rod drive mechanisms for a nuclear reactor and more particularly to a drive mechanism which moves the control rod in a step-by-step manner by magnetic coils and which is especially adapted for rapid refueling of a nuclear reactor.

2. Description of the Prior Art

In a commercial nuclear reactor, heat, from which electricity is generated, is produced by fissioning of a fissile material such as enriched uranium. This fissile material, or nuclear fuel, is typically contained within a core made up of a plurality of fuel elements, coextensively arranged in a spaced parallel array. Movable control rods are dispersed throughout the core to control the fission process. The control rods generally comprise a plurality of elongated rods containing neutron absorbing materials, for example silver, indium and cadmium, which fit in openings among the fuel elements so as to be guided thereby during movement into and out of the core. Inserting a control rod into the core adds more absorber material and hence, decreases the nuclear reaction; conversely, withdrawing a control rod removes absorber material and hence, increases the nuclear reaction and thereby, the power output. The nuclear core and the control rods are positioned within and supported by a reactor vessel through which a reactor coolant flows.

Movement of the control rod into or out from the nuclear core is accomplished by control rod drive mechanisms which are mounted onto the top cover of the reactor vessel. Typically, a reactor pressure vessel is pressurized to a relatively high internal pressure. Therefore, to avoid large forces associated with high pressure drops and to avoid the use of high pressure seals, the control rod drive mechanisms operate at the pressure which exists within the reactor pressure vessel. Hence, the control rod drive mechanisms are housed within pressure bearing housings which for simplicity may be viewed as tubular extensions from the reactor pressure vessel. With this type of arrangement, it is common practice to add a missile shield above the control rod drive mechanisms for safety reasons. In the unlikely event of a major break of the pressure containing portion of the mechanisms, the missile shield would intercept parts of the drive mechanism that would be projected from the pressure vessel in missile like fashion.

In todays large commerical nuclear power plants, one of the more commonly used types of control rod drive mechanisms is referred to as the "magnetic jack" type of mechanism. With this type of mechanism, the control rods are jacked into or out from the nuclear core in a series of motions each involving moving the control rod a discrete incremental distance. The jacking movement is accomplished by two sets of axially spaced magnet coils in conjunction with magnet plungers having gripper arms attached thereto by alternately and sequentially gripping, moving and releasing the control rod. One example of this type of control rod drive mechanism is shown and described in U.S. Pat. No. 3,158,766, entitled "Gripper Type Linear Motion Device," filed Apr. 30, 1962, by Erling Frisch and assigned to the present assignee.

In this art, two magnet coils provide when energized, engagement of the control rod drive shaft by two sets of axially spaced grippers. A third magnet coil achieves lifting of the control rod. A load transfer function whereby the load is transferred from one gripper to the other before disengagement of the gripper initially supporting the drive shaft and a control rod pull down function are achived in this art by resilient means such as springs. The resilient means serve to bias the grippers a predetermined direction to accomplish the load transfer and pull down functions which had been accomplished in earlier art by two additional magnet coils.

In the type of nuclear reactor referred to herein, the nuclear fuel within the core must be replaced on the order of once every year. Core refueling involves removal of spent fuel assemblies and replacing these with new fuel assemblies. During refueling, the reactor is of course shut down and the pressure vessel is open so as to expose the core. Recent art has disclosed methods for rapidly refueling the core so as to minimize the down time of the nuclear reactor.

During rapid refueling all of the control rods are retracted or withdrawn from the nuclear core and stored within hardware which is attached to the closure head of the reactor pressure vessel and is commonly referred to, in the nuclear field, as the upper core support internals. At this time, the control rod drive shafts are fully housed within the pressure containing housing of the control rod drive mechanisms. Thus, with this arrangement, by simply removing the closure head of the reactor pressure vessel the core upper internals as well as the control rods are removed. Details of such an arrangement are disclosed in patent application Ser. No. 406,454 filed Oct. 12, 1973, entitled "Nuclear Reactor Internals Arrangement" by Erling Frishch et al.

Development of rapid refueling techniques and apparatus has revealed the need for utter reliability in the devices which hold the control rods in a retracted position within the upper internals during the refueling operations. Failure of the control rod holding devices at this time would result in the release of a control rod and cause a substantial increase in the refueling time. Such a failure would obviously negate the benefit sought to be achieved by the rapid refueling apparatus. Hence, means have been developed and disclosed whereby control rod drive mechanisms of the magnetic jack type are provided with safety latches which provide the control rods with an independent or redundant support. One such safety latch means is disclosed in U.S. Pat. No. 3,480,807, filed Apr. 11, 1967, entitled "Linear Motion Device," by R. E. Downs, et al. Downs discloses a safety latch which is pivotally mounted inside the housing of the mechanism. The latch is held in a non-latching position by a solenoid plunger to permit free movement of the element during normal reactor operation. The latch is spring biased to a latched position upon dc energization of the solenoid plunger so as to prevent the rod from moving in one of its two possible directions of movement.

While the Downs invention is not directed towards rapid refueling of a nuclear reactor, it is readily adaptable by one skilled in the art to such refueling methods. An arrangement is readily envisioned whereby the saftey latch is only activated when the control rods are fully contained within the upper internals. Should the main rod holding means fail at this time a projection on the safety latch which is in engagement with teeth on the control rod drive shaft would jam into position and effectively prevent the control rod from falling. However, the jamming aspects of such a safety means is not totally satisfactory. It is possible that the forces involved would cause physical deformation of either the teeth on the control rod drive shaft or of the saftey latch itself. Such physical deformation could severely hamper and even prevent future motion of the control rod. That is, when the reactor is reassembled upon the completion of refueling and placed back in power operation, control rod motion may be prevented resulting in loss of reactor control.

Another means for preventing release of the control rod during reactor refueling is disclosed in U.S. Pat. No. 3,766,006 filed July 8, 1970 entitled "Rapidly Refuelable Nuclear Reactor," by Erling Frisch. In this art, the missile shield previously referred to is moved to an upper position during refueling. This movement of the missile shield causes the holding electromagnetic means of the control rod drive mechanism to be replaced by permanent magnet means. After the refueling is completed, the missile shield is displaced downwardly to its normal position, replacing the holding permanent magnet means by the electromagnetic holding means which can then be readily deenergized. Hence, an electrical failure during reactor refueling would not result in release of a control rod. This arrangement is not totally satisfactory either. Major modifications are required of each control rod drive mechanism. Such modifications which include additional hardware, require space which may not be available in most reactor installations. Also, the modifications are quite expensive and complicated.

Therefore, there exists a continuing need to provide improved means for holding control rods of a nuclear reactor in a fully withdrawn position during reactor refueling.

SUMMARY OF THE INVENTION

In accordance with this invention the control rods of a nuclear reactor are safely held in a retracted position during reactor refueling by appropriate means such as electromechanical holding means which operate separately from electromagnet means which grip and move the control rods during reactor operation. The electromechanical means is operable only when the reactor has sufficiently cooled down after reactor shut down and when the missile shield has been removed. Reactor operating temperatures cause the electrical resistance of a magnet coil of the electromechanical holding means to increase to a value whereby the power supplied will not energize the holding means. In certain applications, removal of the missile shield is required to expose an electrical connector of the electromechanical holding means so that an electrical circuit associated therewith can only be completed electrically at this time.

Energizing the magnet coil activates a magnet plunger causing it to move a predetermined distance. A locking member, which in one embodiment comprises a ring, is mounted to the magnet plunger. When activated, the locking member moves to a position behind gripper latches of the drive mechanism when the latches are in engagement with teeth on the control rod drive shaft. A mechanical interlock thereby results which prevents the gripper latches from releasing the control rods. Thus, any electrical failure or power interruption at this time would not result in the release of the control rod.

BRIEF DESCRIPTION OF THE DRAWINGS

For a better understanding of this invention, both as to its organization and as to its method of operation, together with additional advantages thereof, reference is made to the following description taken in connection with the accompanying drawings, in which.

DESCRIPTION OF THE PREFERRED EMBODIMENTS

Figure 1:
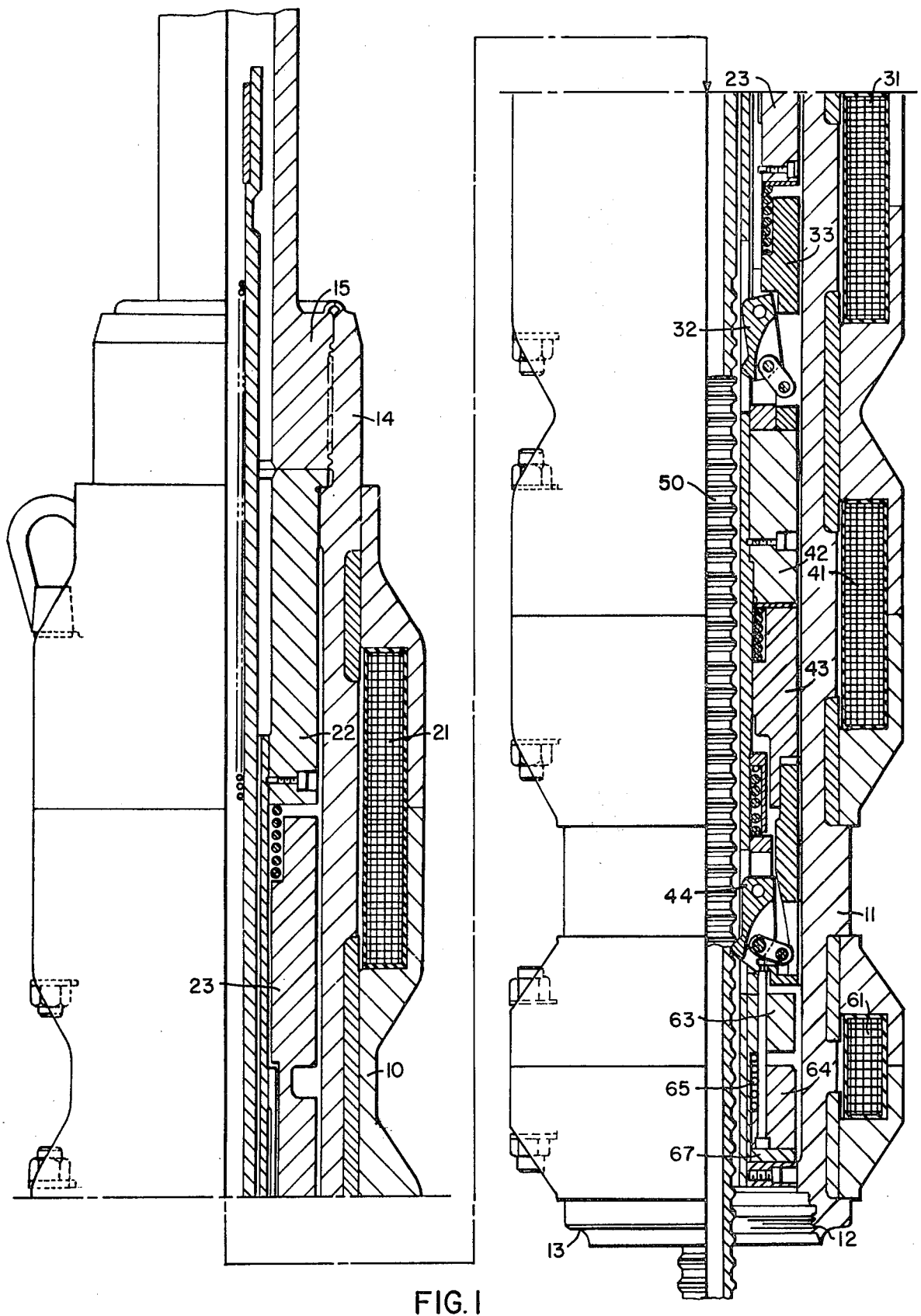
FIG. 1 is a composite elevational view, partially in section, of a magnetic jack type of control rod drive mechanism embodying an exemplary arrangement of this invention.
Figure 2:
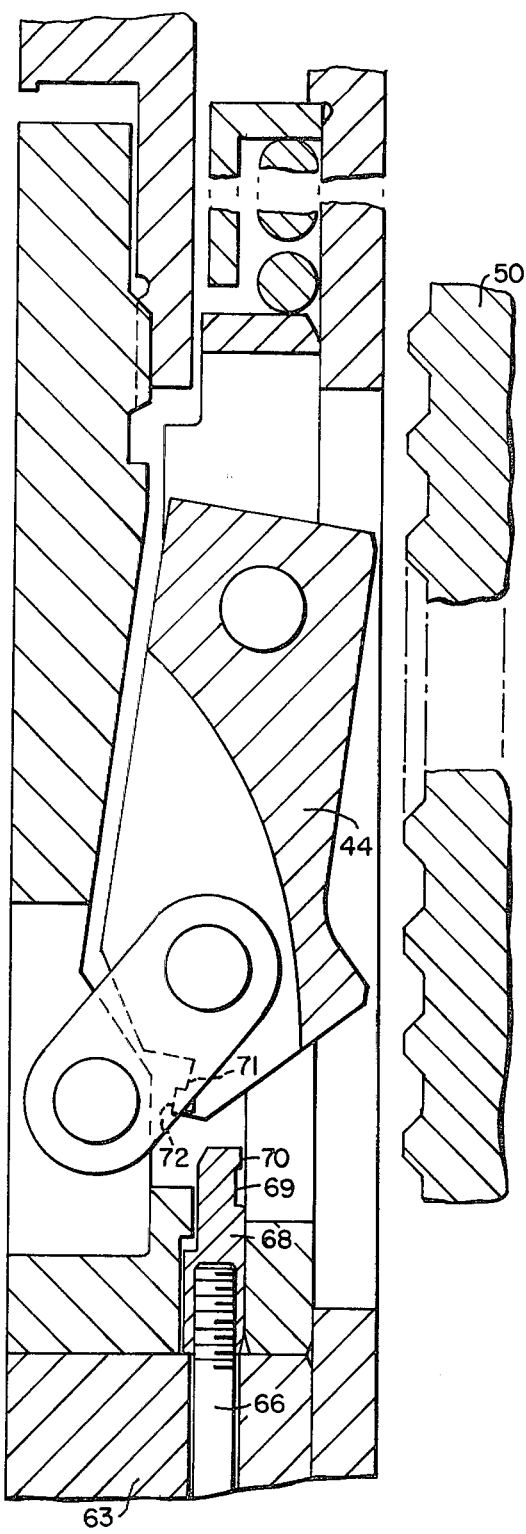
FIG. 2 is an enlarged view of the locking apparatus provided by this invention illustrating a non-locking position.

Throughout the description which follows, like reference characters indicate like elements in various figures of the drawings.

Referring now more particularly to FIG. 1 of the drawings, a control rod drive mechanism constructed in accordance with the principles of this invention is illustrated therein. In this example, three magnet coils comprising for example, flat faced plunger magnets, are utilized to provide incremental linear motion to a drive shaft of a control rod. The invention however, is not necessarily limited to this type of drive mechanism. The principles of this invention as explained hereinafter may be applied equally to mechanisms having a different number and types of magnet coils.

In the illustrated example, the control rod drive mechanism is provided with a hermetically sealed housing 10 formed from substantially non-magnetic material of a thickness capable of withstanding internal pressures on the order of 2000 psi. A lower end 11 of the housing 10 is provided with internal treads 12 for the purpose of threadingly connecting the housing to the head of a reactor pressure vessel (not shown). The lower end 11 is also fitted with a weld preparation 13 so that the housing may be welded to the pressure vessel in order to form a hermetical seal. The top portion 14 of the housing 10 is similarly threaded and welded to a pressure containing plug 15 to complete the sealed system. Three magnet coils 21, 31 and 41 are secured to housing 10 by conventional means such as by the manner illustrated.

Sequential activation of magnet coils 31 and 21, in that order results in gripping of control rod drive shaft 50 by latch arm 32 followed by incremental axial movement of drive shaft 50, gripper pole 23, gripper latch pole 33, and latch arm 32, as a single unit. Hence, magnet coil 31 serves as a a gripper magnet coil which upon being energized causes motion of gripper latch pole 33 such that latch arm 32 pivots and engages drive shaft 50. And, magnet coil 21 serves as a lift coil in moving magnet pole 23 to which latch arm 32 is attached.

Gripper pole 42 and latch pole 43 are associated with magnet coil 41. Gripper pole 42 is fixed with respect to housing 10 as is lift pole 22. Gripper latch pole 43, on the other hand is mounted for axial movement with respect to the housing 10. Energization of magnet coil 41 causes gripper latch pole 43 to move axially until it is in contact with gripper pole 42. This motion results in rotation of latch arm 44 thereby effectuating engagement of latch arm 44 with the drive shaft 50.

In accordance with the above, operation of the control rod drive mechanism illustrated in FIG. 1 is achieved by sequentially energizing and deenergizing magnet coils 21, 31 and 41 in a predetermined manner. For example, if incremental upward movement of the drive shaft 50 is desired, and if the drive mechanism is in the position illustrated in FIG. 1 upward motion will be achieved as follows.

Gripper latch coil 31 is energized so as to cause latch arm 32 to pivot into engagement with drive shaft 50. At this point, drive shaft 50 is engaged by both latch arm 32 and latch arm 44 as illustrated in the drawing. Gripper latch coil 41 is deenergized causing gripper latch pole 43 to move axially downward and thereby cause latch arm 44 to pivot out of engagement with drive shaft 50. Lift coil 21 is now energized causing magnet pole 23 to move axially upward which motion results in lifting of drive shaft 50. Gripper latch coil 41 is again energized causing latch arm 44 to become engaged with drive shaft 50 but at a new location on drive shaft 50. This new location is exactly one incremental length lower with the incremental length being equal to the pitch distance between adjacent teeth on the drive shaft 50. With the drive shaft 50 so engaged, the upper latch arm 32 may be disengaged by deenergization of latch coil 31. Deenergization of lift coil 21 then results in the lowering of latch arm 32 a length equal to one increment as previously explained. This procedure is continuously repeated until the control rod is lifted a predetermined distance.

The manner by which a control rod is lowered by sequential energization of the aforementioned magnet coil involves a sequence which is essentially a reversal of that outlined above and should be readily apparent to one skilled in the art.

It is to be noted that the above description comprises a relatively simplified explanation of a magnetic jack type of control rod drive mechanism. Also involved in the mechanism, but not described is a feature whereby wear of the teeth of the drive shaft 50 and of the latch arms 32 and 44 are minimized. This is accomplished for example by transferring the load of the control rod from latch arm 32 to latch arm 44 before latch arm 32 is disengaged from the control rod drive shaft 50. Therefore, although not described in detail this load transferring feature is to be considered a part of the illustrating control rod drive mechanism. Additional details of the construction operation of the control rod drive mechanism thus far described may be found in U.S. Pat. No. 3,158,766 entitled "Gripper Type Linear Motion Device," issued Nov. 24, 1964, by Erling Frisch and assigned to the present assignee, which is hereby incorporated by reference.

It is to be observed, that the control rod drive mechanism will release the control rod drive shaft 50 in the event of a sudden interruption of electrical power. Without electrical power, magnet coils 21, 31 and 41 become deenergized thereby disengaging latch arms 32 and 44 from the drive shaft 50. Assuming the drive shaft to be axially oriented, being free of restraint it will move downward under the influence of gravity. The apparatus, as provided by this invention, hereinafter described is designed to retain the control rod in a fully withdrawn position, for example, during reactor refueling, when all electrical power is removed.

Still referring to FIG. 1, it is seen that an additional magnet coil 61 is included with the drive mechanism. A stationary magnet pole 63 having a cylindrical configuration is fixedly positioned within housing 10 at the lower end 11 thereof and axially below latch arm 44. A movable magnetic plunger 64 is fitted within an annular space provided by a cutaway portion of the cylindrical surface of magnet pole 63. Magnet plunger 64 is thus both concentrically and axially mounted with respect to magnet pole 63. Magnet plunger 64 has an axial length smaller than that of the annular space within which it operates. The difference in length is equal to the stroke of the magnet plunger 64. A resilient member such as spring 65, biases the magnet plunger 64 in the downward position shown in FIG. 1 when magnet coil 61 is non-energized.

A lock pin 66 is fitted to magnetic plunger 64 at a circumferential location which corresponds to the circumferential location of latch arm 44. Since three latch arms 44 are utilized with the illustration mechanism, three lock pins 66 are employed. It is not however to be implied, that the number of lock pins 66 or the location thereof are necessarily limited to the number and location of latch arms. Indeed, one skilled in the art can readily envision one or more locking pin-latch arm arrangements which will operate as described more fully hereinafter. One method of securing lock pins 66 to the magnetic plunger 64 is shown in the drawings which comprises capturing a headed end of lock pin 66 between the magnetic plunger and a cap member 67 which is bolted thereto. Axial channels are provided within magnet pole 63 so that lock pins 66 may extend therethrough to a position in close proximity to latch arms 44.

An ring member 68 is fitted to the ends of lock pins 66, such as by threading. This is shown more clearly in FIGS. 2 through 5 of the drawings. A detent 69 comprising a groove exists within the internal circumference of ring member 68 and thereby forms a protruding ledge 70. Similarly, latch arms 44 are provided with detent 71 and protrusion 72 which are oppositely oriented to those of ring member 68.

Figure 3:
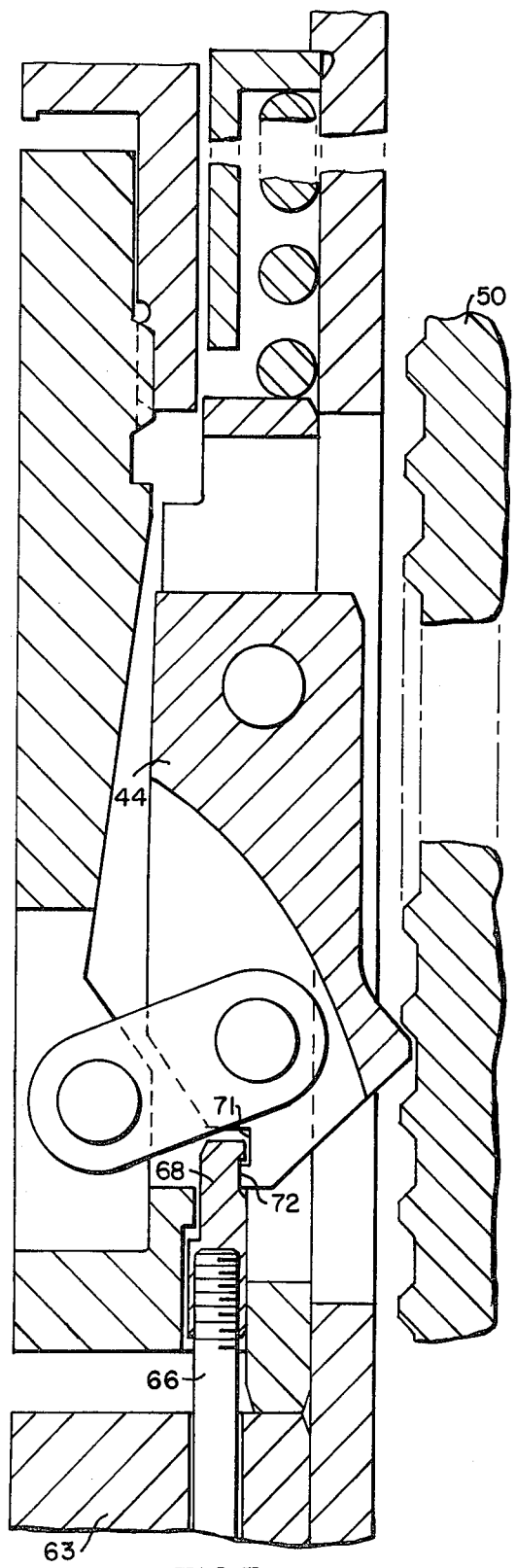
FIG. 3 is an enlarged view of the locking mechanism in interlocking engagement.
Figure 4:
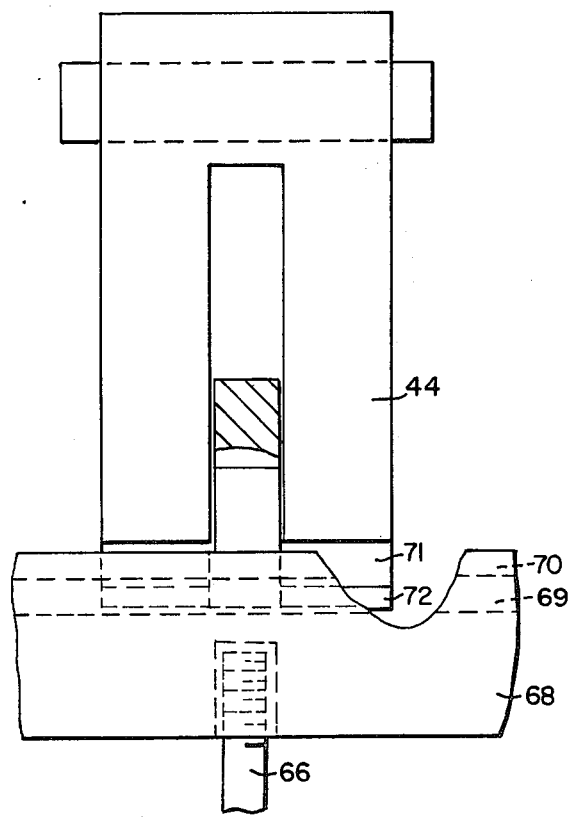
FIG. 4 is a view taken along the line IV—IV of FIG. 3.

With latch arm 44 in engagement with the drive shaft 50 of the control rod, energization of magnet coil 61 causes magnet plunger 64, lock pins 66 and ring member 68 to move axially upward until magnetic plunger 64 contacts magnet pole 63. At this time, the detent and protrusions on ring member 68 and latch arms 44 are positioned axially as shown in FIG. 3. Another view of this axial position as shown in FIG. 4. Should magnet coil 41 be deenergized for any reason at this time, latch arms 44 will attempt to be pivoted out of engagement with drive shaft 50 but will be prevented from doing by ring member 68. Latch arms 44 and ring member 68 will interlockingly engage as shown in FIG. 3 of the drawings. Hence, the control rod will be prevented from any further axial motion. Even further, should power to magnet coil 61 now be interrupted latch arms 44 and ring member 68 will remain interlocked because of the oppositely oriented configuration of the detent and protrusion on these members. Therefore, the control rod will again be prevented from further axial motion.

It is to be observed, that prior to the deenergization of magnet coil 41, latch arms 44 are more fully engaged with drive shaft 50 than that shown in FIG. 3. That is, when latch arm 44 is normally engaged with drive shaft 50, the protruding ledge 72 is positioned radially inward of the protruding ledge 70 of ring member 68. This difference in radial position is necessary in order to allow ring member 68 to be moved axially upward and behind latch arm 44. The interlocking engagement shown in FIG. 3 then is achieved after interruption of electrical power to magnet coil 41 and latch arms 44 has pivoted away a slight amount from drive shaft 50. In order to resume normal operation of a control rod it is therefore necessary first to disengage ring member 68 from latch arms 44. This is accomplished by energizing magnet coil 61 then reenergizing magnet coil 41. Latch arms 44 have now pivoted out of interlocking engagement with ring member 68. Deenergizing magnet coil 61 then allows spring 65 to force magnet plunger 64 and hence ring member 68 axially downward. Latch arms 44 are now able to operate normally.

Since the apparatus described above must not be capable of being employed accept when specifically desired, provisions must be and are included to preclude accidental or inadvertent energization of magnet coil 61. A number of techniques are readily envisioned whereby prevention of such inadvertent operation is assured. For example:

The electrical connector to magnet coil 61 may be made inaccessible until such time as the reactor missile shield is removed;

The power supply for magnet coil 61 may be located within a building containing the reactor vessel rather than within the reactor control room. This will require operating personnel to physically enter the containment building in order to effectuate electrical hook up. Entrance to the reactor containment is possible only when the reactor is shut down such as during refueling;

The power supply may be direct current and have only one output line. Thus, only one magnet coil 61 can be energized at one time. And, since the actuating current is direct current, an accidental short circuit to an alternating current source will not activate the magnet coil 61;

The magnet coil 61 may be designed, as regards to its wire diameter, so that the resulting number of ampere turns of magnet coil 61 will not actuate magnet plunger 64 when the voltage supply of magnet coils 21, 31 or 41 is inadvertently applied to magnet coil 61. For example, if the voltage supply to magnet coils 21, 31 and 41 is 125 volts D.C., then the wire diameter of coil 61 is to be of a size such that a voltage of 170 volts D.C. at 20° C or more must be applied to magnet coil 61 to activate magnet plunger 64. The power supply to magnet coil 61 may be set to activate plunger 64 at approximately 250 volts D.C. The resistance of magnet coil 61 varies with temperature; therefore, the number of ampere turns varies with temperature. The number of ampere turns of magnet coil 61 may be designed to activate magnet plunger 64 at a nominal temperature of 120° C. Thus, a temperature of 144° C will not provide a sufficient number of ampere turns to activate magnet plunger 64. Hence, it is necessary to thermally insulate magnet coil 61 so that it will achieve temperatures in excess of for example 150° C to provide an adequate safety margin.

In accordance with the above, there has been disclosed a control rod drive mechanism for a nuclear reactor which includes safety apparatus for positively holding the control rod in a withdrawn position during such times as reactor refueling and when electrical power to the mechanism is interrupted. During normal reactor operation the control rod holding apparatus provided by this invention is positively prevented from being activated and therefore does not interfere with normal operation of the drive mechanism.

Since numerous changes may be made in the above described apparatus and different embodiments of the invention may be made without departing from the spirit and scope thereof, it is intended that all the matter contained in the foregoing description or shown in the accompanying drawings shall be interpreted as illustrative and not in a limiting sense.

I claim as my invention:

1. Drive apparatus which is mounted to a pressure vessel containing a nuclear core and is adapted to move a drive shaft and an attached control rod into and out of the core in a step-by-step manner including a housing, said drive shaft being disposed for axial movement within said housing, a pair of axially spaced gripper means pivotally mounted within said housing for engaging and disengaging said drive shaft, first electrically energized magnet coil means mounted to said housing for actuating said gripper means and for moving said drive shaft in said step-by-step manner, and locking means for preventing disengagement of said gripper means from said drive shaft upon interruption of electrical power to said first magnet coil means, said locking means including second electrically energized magnet coil means which is electrically independent of said first magnet coil means.

2. The drive apparatus of claim 1, wherein said drive shaft has a plurality of axially spaced teeth thereon, and each of said gripper means comprises at least one gripper member having a projection thereon for engaging with said teeth on said drive shaft, said gripper member being pivotally connected within said housing and being pivotally moved into and out of engagement with said drive shaft by said first magnet coil means.

3. The drive apparatus of claim 1, wherein said first magnet coil means includes a magnet coil which is attached to said housing in spaced concentric relationship with said drive shaft, a non-movable magnet pole and a movable magnet plunger axially spaced therefrom, said non-movable pole and said movable plunger each having an annular configuration and being interposed concentrically between said drive shaft and said magnet coil, said gripper means including a latch member which is pivotally connected at one end to said magnet pole and a link member which pivotally connects the other end of said latch member to said magnet plunger, said magnet coil serving to move said magnet plunger and thereby pivot said latch member into engagement with and out of engagement with said control rod drive shaft.

4. The drive apparatus of claim 1 wherein said locking means includes a locking member, and said second magnet coil means includes a magnet coil which is mounted on said housing in spaced concentric relationship with said drive shaft, a magnet pole and a magnet plunger axially spaced therefrom, said magnet pole and said magnet plunger being interposed concentrically between said drive shaft and said magnet coil, said locking member being fixedly connected to said magnet plunger such that activation of said magnet coil moves said magnet plunger and said locking member attached thereto into a position behind said gripping means to prevent disengagement of said gripper means from said control rod drive shaft.

5. The drive apparatus of claim 1, wherein said drive shaft has a plurality of axially spaced teeth thereon, and each of said gripper means includes a latch member having a projection thereon for engaging with said teeth on said drive shaft, said latch member being pivotally connected to a support member within said housing and being pivotally moved into and out of engagement with said drive shaft by said first magnet coil means, and said locking means includes a ring which is moved axially by said second magnet coil means, said ring being axially positioned with respect to said latch member such that when said second magnet coil means is activated a portion of said latch member extends through said ring to prevent pivoting of said latch member and thereby disengagement of said latch member from said drive shaft, and when said second magnet coil means is not activated said ring is axially displaced from said latch member thereby permitting pivoting of said latch member and its disengagement from said drive shaft.

6. The drive apparatus of claim 1 wherein said first magnet coil means is activated by first direct current voltage, and said second magnet coil means is activated by second direct current voltage, said second voltage being substantially higher than said first voltage such that said second magnet coil means cannot be activated by said first voltage.

7. The drive apparatus of claim 1, wherein said second magnet coil means is activated at approximately 250 Volts direct current, and is thermally insulated to be above 150° during reactor power operation, at which temperature the electrical resistance of said second magnet coil means is increased so that said activation voltage will be insufficient to activate said second magnet coil means.

8. The drive apparatus of claim 1, wherein a missile shield is located above said drive apparatus, said missile shield having to be removed in order to open said reactor vessel to expose said core, and said second magnet coil means has an electrical connector attached thereto for applying electricity to said second magnet coil means, said electrical connector being exposed only when said missile shield is removed such that connection of electrical power to said second magnet coil means is possible only when said missile shield is removed.

* * * * *